United States Patent [19]

Watanabe et al.

[11] Patent Number: 4,761,212

[45] Date of Patent: Aug. 2, 1988

[54] MULTIPLE COATING METHOD

[75] Inventors: Tadashi Watanabe, Hiratsuka; Yoichi Masubuchi, Yokohama; Akira Tominaga, Chigasaki; Haruo Nagaoka, Hiratsuka; Eisaku Nakatani, Hiratsuka; Masafumi Kume, Hiratsuka, all of Japan

[73] Assignee: Kansai Paint Company, Limited, Amagasaki, Japan

[21] Appl. No.: 832,623

[22] Filed: Feb. 25, 1986

[30] Foreign Application Priority Data

Feb. 27, 1985 [JP] Japan ................... 60-38555

[51] Int. Cl.$^4$ ............................. C25D 13/06
[52] U.S. Cl. ..................... 204/181.1; 204/181.7; 427/407.1; 427/409; 427/410
[58] Field of Search .............. 204/181.1, 181.7; 427/410, 407.1, 409

[56] References Cited

U.S. PATENT DOCUMENTS

| | | | |
|---|---|---|---|
| 3,619,398 | 11/1971 | Bosso et al. | 204/181.7 |
| 3,676,383 | 7/1972 | Scala et al. | 204/181.7 |
| 3,998,716 | 12/1976 | Masar et al. | 204/181.1 |
| 4,375,498 | 3/1983 | Le Minez et al. | 204/181.1 |
| 4,463,038 | 7/1984 | Takeuchi et al. | 427/407.1 |
| 4,529,632 | 7/1985 | Fujii et al. | 427/407.1 |
| 4,536,558 | 8/1985 | Kordomenos | 204/181.7 |

FOREIGN PATENT DOCUMENTS 49-8694  2/1974  Japan ................... 204/181.1

*Primary Examiner*—John F. Niebling
*Assistant Examiner*—Ben C. Hsing
*Attorney, Agent, or Firm*—Armstrong, Nikaido, Marmelstein & Kubovcik

[57] ABSTRACT

This invention provides a coating method comprising the steps of applying to an electroconductive substrate a cationic electrophoretic primer which contains a binder resin having in its molecule a functional group capable of reacting with an isocyanate group under a curing condition to form a primer coat, applying to the primer coat a surfacer or topcoating containing a hydroxyl-containing resin and polyisocyanate compound to form a surfacer coat or topcoat and curing the two coats at the same time at a temperature between room temperature and about 130° C.

10 Claims, No Drawings

MULTIPLE COATING METHOD

This invention relates to a novel method for coating an electroconductive article.

Known methods for coating an electroconductive substrate such as metallic articles include those in which a cationic electrophoretic coating composition is applied as a primer to form a coat or film of the primer and a surfacer or topcoating is applied thereto to form a coat or film of the surfacer or topcoating. Unlike anionic electrophoretic coating compositions, cationic electrophoretic coating compositions will not dissolve the metal of the substrate nor the coat formed by surface treatment and are outstanding in resistance to corrosion and to alkalis. Therefore, the coating methods using cationic electrophoretic primers are widely used for coating metallic substrates such as automotive bodies or parts, electric appliances, house frames, etc.

However, cationic electrophoretic primers, which contain a thermosetting resin as a binder, must be baked at a temperature of far higher than about 140° C., thus involving high fuel costs.

In recent years, plastics such as polypropylene, ABS resins, urethane resins, polyamides and the like have been increasingly used to produce integral parts in outer metallic portions of automobiles, electric appliances and like articles. From the viewpoint of process rationalization, it is strongly desired to coat metallic bodies having such built-in plastics parts (such coating may be hereinafter referred to as "composite coating"). However, since the plastic parts have a low heat distortion temperature, cationic electrophoretic primers which have to be baked at high temeratures can not be used in composite coating. To overcome this problem, it is desired to develop a coating method in which the cationic electrophoretic primer can be cured at or below a temperature of about 130° C.

It is an object of this invention to provide a novel coating method which is free from the drawbacks of conventional coating methods and which can meet the foregoing demand.

It is an object of the invention to provide a coating method which can cure a primer coat at a temperature of about 130° C. or lower and facilitates coating a metallic body with energy savings and achieving a composite coating over the metallic body having built-in plastics parts.

These and other objects of the invention will become apparent from the following description.

This invention provides a coating method comprising the steps of applying to an electroconductive substrate a cationic electrophoretic primer which contains a binder resin having in the molecule at least one functional group capable of reacting with isocyanate group under a curing condition to form a primer coat, applying to the primer coat a surfacer or topcoating containing a hydroxyl group-containing resin and a polyisocyanate compound to form a surfacer coat or topcoat and curing the two coats at the same time at a temperature between room temperature and about 130° C.

According to the present invention, when the primer and surfacer or topcoating are cured at the same time at a temperature of about 130° C. or lower, crosslinking occurs proceeds between the hydroxyl group-containing resin and the polyisocyanate compound present in the surfacer coat or topcoat, and simultaneously the cationic resin in the primer coat is crosslinked by reacting with the isocyanate compound which has penetrated from the surfacer coat or topcoat to thereby provide a coat having an improved appearance, good surface smoothness and high resistance to weather and water. In this way, the crosslinking reaction (curing) of the coats proceeds at about 130° C. or lower to a satisfactory extent, thereby enabling the composite coating with energy saving.

The cationic electrophoretic primer to be used in this invention is an aqueous composition having dissolved or dispersed therein as a main binder a cationic resin having in the molecule at least one functional group capable of reacting with the polyisocyanate compound from the surfacer coat or topcoat under a curing condition. The composition may contain, when required, additives such as coloring pigment, extender pigment, anti-corrosive pigment, surfactant, organic solvent, etc. The composition may further include a catalyst for promoting the reaction between the functional group of the binder resin and the isocyanate group.

The cationic resin to be used as the main binder component has in the molecule at least one functional group capable of reacting with the isocyanate group, such as the hydroxyl group (—OH), a primary amino group (—NH$_2$), a secondary amino or imino group (>NH), etc. The most suitable cationic resins include those prepared by reacting an epoxy resin with a compound capable of rendering the resin protonic (hereinafter referred to as "cation-modifier").

Preferred epoxy resins are those produced by reacting a polyphenol compound with epichlorohydrin. Examples of useful polyphenol compounds are bis(4-hydroxyphenyl)methane, bis(4-hydroxyphenyl)-1,1-ethane, bis(4-hydroxyphenyl)-2,2-propane and like bisphenols, phenol novolak, cresol novolak, etc. The most preferred epoxy resins to be used in this invention are those with a higher molecular weight prepared by further reacting the above epoxy resin with bisphenol compounds such as bis(4-hydroxyphenyl)methane, bis(4-hydroxyphenyl)-1,1-ethane, bis(4-hydroxyphenyl)-2,2-propane, etc. Also usable are addition products of the epoxy resin and polyhydric alcohols (e.g., ethylene glycol, 1,6-hexanediol, pentaerythritol, etc.), polyether polyols, polyester polyols, polyamide amines, polycarboxylic acids, polyisocyanates or the like. Further examples of useful resins are those prepared by graft copolymerization of εcaprolactones, acrylic or methacrylic monomers or the like with the epoxy resin. These epoxy resins may be used alone or in mixture with alicyclic or aliphatic epoxy resins, glycidyl-containig acrylic resins, or epoxidized polybutadienes or the like.

Examples of the cation-modifiers to be reacted with the epoxy resin are aliphatic or alicyclic primary or secondary amines and like basic compounds (in this case, cationized by neutralization with organic acid after the reaction), salts of tertiary amines, salts of secondary sulfides, salts of tertiary phosphines, etc.

Examples of useful basic compounds are:

(1) primary monoamines such as methylamine, ethylamine, n-or iso-propylamine, monoethanolamine, n- or iso-propanolamine and the like:

(2) secondary monoamines such as diethylamine, diethanolamine, di-n- or iso-propanolamine, N-methylethanolamine, N-ethylethanolamine and the like;

(3) primary or secondary polyamines such as ethylenediamine, diethylenetriamine, hydroxyethylaminoethylamine, ethylaminoethylamine, methylaminopropylamine, dimethylaminoethylamine, dimethylamiopropylamine and the like; and (4) basic compounds such as ammonia, hydroxylamine, hydrazine, hydroxyethyl hydrazine and the like.

Among these examples, the more preferred are hydroxyl group-containing alkanolamines such as diethanolamine, N-methylethanolamine, monoethanolamine, N-ethylethanolamine, etc.

The epoxy resin can be modified to a cationic resin with the foregoing cation-modifier by the following methods.

(a) The basic compound is reacted with the epoxy group present in the epoxy resin and the reaction product is protonized with an organic acid such as formic acid, acetic acid, propionic acid, butyric acid, lactic acid and the like to give a cationic resin. A suitable amount of the acid is about 0.3 to about 0.6 equivalent of the amine value (usually ranging from about 20 to about 200) of the reaction product of the epoxy resin and the basic compound. Partially blocked amino compounds obtained by reacting the polyamine compound with a ketone compound such as methyl isobutyl ketone, methyl ethyl ketone and ethyl butyl ketone to convert primary amino groups into ketimine groups can be used preferably as a basic oompound.

The tertiary aminomonoisocyanate prepared from tertiary amino alcohol and diisocyanate compound may be reacted with the hydroxyl group in the epoxy resin and neutralized with acid to protonize the resin.

(b) The acid as exemplified above in (a) is reacted with a tertiary amine such as triethylamine, triethanolamine, N',N'-dimethylethanolamine, N-methyldiethanolamine, N,N-diethylethanolamine and N-ethyldiethanolamine to obtain a protonized compound and the resulting compound is reacted with the epoxy group in the epoxy resin to form a quaternary ammonium salt.

(c) A salt of a secondary sulfide (e.g. diethyl sulfide, diphenyl sulfide, tetramethylene sulfide, thiodiethanol, etc.) with boric acid, carbonic acid or an organic acid is reacted with the epoxy group in the epoxy resin to form a tertiary sulfonium salt.

(d) A salt of a tertiary phosphine (e.g. trietylphosphine, phenyldimethylphosphine, diphenylmethylphenyldimethylphosphine, phosphine, triphenylphosphine, etc.) with the acid exemplified above in (c) is reacted with the epoxy group in the epoxy resin to form a quaternary phosphonium salt.

Other conventional cationic group-containing resins than the epoxy resins exemplified above can be used as the binder for the cationic electrophoretic primer of the invention. For example, the following resins are also usable:

(1) a polycondensation product of a polycarboxylic acid and polyamine (U.S. Pat. No. 2,450,940), protonized with an acid;

(2) an amine-terminated polyaddition product of a polyisocyanate, polyol and monoamine or polyamine, protonized with an acid:

(3) a copolymer of hydroxyl group- and amino group-containing acrylic or vinyl monomers with other acrylic or vinyl monomer, protonized with an acid (Japanese Examined Patent Publications No. 12395/1970 and No. 12396/1970);

(4) an addition product of a polycarboxylic acid resin with an alkylene imine, protonized with an acid (U.S. Pat. No. 3,403,088); etc.

Preferable cationic resins which can be used in this invention are those so meltable as to give a smooth surface when heated for drying or curing. Preferable resins are those having a static glass transition temperature (Tg) of about 50 to about 120° C., more preferably about 70 to about 100° C. and a number-average molecular weight of about 1,500 to about 30,000, more preferably about 3,000 to about 15,000.

The content of cationic group present in the cationic resin is in such range that the cationic resin can be stably dissolved or dispersed in water. More specifically, it is in terms of neutralization value of about 3 to about 30, preferably about 5 to about 15 (KOH mg/g) Even with a neutralization value of less than 3, the cationic resin is dispersable in water and usable in the invention if a surfactant or the like is used conjointly.

When the cationic resin has a primary or secondary amino group as a well as hydroxyl group, the resin can smoothly react with the isocyanate compound from the surfacer coat or topcoat without addition of a catalyst. However, when required, the primer may contain a catalyst for promoting the reaction in order to accelerate the crosslinking reaction. Examples of useful catalysts include those stable in water such as lead silicate, lead acetate, dibutyl tin oxide, dioctyl tin oxide, etc.

The primer may incorporate therein a co-solvent or surfactant to favor the dispersion of the cationic resin in water and may further contain other additives commonly used for electrophoretic coating compositions, such as coloring pigment, extender pigment, anti-ccrrosive pigment, etc.

The surfacer or topcoating to be applied to the primer coat in this invention is an organic solvent composition having dispersed or dissolved therein a hydroxyl group-containing resin and a polyisocyanate compound as vehicle components.

Examples of the basic structure of the hydroxyl group-containing resins are acrylic resins; modified acrylic resins such as chlorinated polyolefin-modified acrylic resins, polycaprolactone-modified acrylic resins, urethane-modified acrylic resins, etc.; polyester resins; modified polyester resins such as polycaprolactone-modified polyester resins, polyurethane-modified polyester resins, etc. According to this invention, use is made of these resins having hydroxyl groups introduced in the molecules.

The hydroxyl group-containing acrylic resins useful in the invention can be prepared by copolymerizing an acrylate monomer with a hydroxyl group-containing vinyl monomer in the usual manner. Other vinyl monomers copolymerizable with the acrylate monomers can also be used for the copolymerization, as required. Preferred examples of acrylate monomers are alkyl ($C_{1-18}$) or alkoxyalkyl ($C_{2-18}$) acrylate or methacrylate. Examples of hydroxyl group-containing vinyl monomers are hydroxyethyl acrylate, hydroxyethyl methacrylate, hydroxypropyl acrylate, hydroxypropyl methacrylate, and like $C_{2-5}$ hydroxyalkyl acrylate or methacrylate: adducts of glycidyl acrylate or glycidyl methacrylate with monocarboxylic acid ($C_{2-18}$); adducts of glycidyl monocarboxylate (e.g. "Cardura E," tradename, product of Shell Petroleum Chemical Co., Ltd., U.S.A.) with acrylic acid or methacrylic acid; N-methylolacrylamide; etc. Examples of other vinyl monomers copolymerizable with the above acrylate monomer are acrylic acid, methacrylic acid, fumaric acid, maleic acid, styrene, α-methylstyrene, vinyltoluene, vinylpyridine, glycidyl acrylate, glycidyl methacrylate, allylglycidyl ether, acrylamide, N-butoxymethyl acrylamide, acrylonitrile, etc.

The hydroxyl group-containing chlorinated polyolefin-modified acrylic resin useful in the invention can be prepared by graft polymerization of chlorinated polyolefin with acrylate monomer, hydroxyl group-containing monomer and, when required, vinyl monomer. Useful acrylate monomers, hydroxyl group-containing monomers and vinyl monomers are those exemplified above. Usable as ohlorinated polyolefins are polyolefins chlorinated by about 50 mole % or less, preferably about 10 to about 45 mole %, more preferably about 20 to about 40 mole %. Examples of polyolefins to be chlorinated are those prepared by homopolymerizing or copolymerizing olefins such as ethylene, propylene, 1-butene, 3-methyl-1-butene, 3-methyl-1-heptene and the like, or copolymerizing the olefin with vinyl acetate, butadiene, acrylate, methacrylate or like vinyl monomers. These polyolefins are chlorinated by conventional methods. Examples of suitable chlorinated polyolefins are chlorinated polyethylene, chlorinated polypropylene, chlorinated ethylene-propylene copolymer, chlorinated ethylene-vinyl acetate copolymer, etc. The amount of the whole monomers to be grafted to the chlorinated polyolefin is about 10 to about 90 % by weight, preferably about 30 to about 80 %, based on the combined amount of the monomers and the chlorinated polyolefin.

Illustrative of useful hydroxyl group-containing caprolactone-modified acrylic resins are a polymer of an addition product of ε-caprolactone and 2-hydroxyethyl methacrylate or like hydroxyl group-containing acrylic monomer and a copolymer of the addition product with the acrylate monomer, hydroxy-containing vinyl monomer or other vinyl monomers exemplified hereinbefore.

Examples of useful hydroxyl group-containing urethane-modified acrylic resins are those prepared by copolymerizing an addition product of hydroxyl group-containing vinyl monomer (e.g. 2-hydroxyethyl methacrylate, etc.) and diisocyanate compound (e.g. isophorone diisocyanate, etc.) with another acrylate or vinyl monomer, and reacting the isocyanate groups of the resulting copolymer with polyol. The urethane-modified acrylic resins also include those having an urethane linkage formed by reacting the foregoing hydroxyl group-containing acrylic resin with a polyisocyanate compound, e.g. hexamethylene diisocyanate or monoisocyanate compound, e.g. butyl isocyanate.

Polyester resins are produced by reacting a polybasic acid with a polyhydric alcohol. Examples of polybasic acids include acids having at least two carboxyl groups in the molecule and anhydrides thereof. Preferred examples are phthalic anhydride, tetrahydrophthalic anhydride, isophthalic acid, maleic anhydride, fumaric acid, trimellitic anhydride, methylene tricyclohexene tricarboxyl anhydride, pyromellitic anhydride, itaconic acid, adipic acid, sebacic acid, azelaic acid, hexahydrophthalic anhydride, 3,6-endomethylenetetrahydrophthalic anhydride, succinic anhydride, "Het Anhydride" (tradename, product of Hooker Chemical Corp.), etc. Useful polyhydric alcohols are, for example, ethylene glycol, diethylene glycol, triethylene glycol, propylene glycol, neopentyl glycol, butylene glycol, hexanediol, trimethylolethane, trimethylolpropane, pentaerythritol, dipentaerythritol, sorbitol, etc. Polyester resins may be any of those modified with monobasic acids, fatty acids, oil or the like. The hydroxyl group can be easily introduced into the polyester resin by using as a part or whole of polyhydric alcohol components those having at least three hydroxyl groups in the molecule, epoxy resin or the like.

Examples of useful hydroxyl group-containing caprolactone-modified polyester resins are those, for example, prepared by reacting the foregoing hydroxyl group-containing polyester resin with ε-caprolactone in the presence of a suitable catalyst.

Examples of useful hydroxyl group-containing urethane-modified polyester resins are those having an urethane linkage formed by reacting hexamethylene diisocyanate or like polyisocyanate compound with the foregoing hydroxyl group-containing polyester resin.

Preferred hydroxyl group-containing resins for the surfacer or topcoating are hydroxyl group-containing acrylic resins and hydroxyl group-containing polyester resins.

The hydroxyl group content in the hydroxyl group-containing resin to be used in the invention can be varied in a wide range and is usually in terms of a hydroxyl value of about 20 to about 200, preferably about 30 to about 180. These resins have a number-average molecular weight of preferably about 8,000 to about 60,000, more preferably about 10,000 to about 40,000.

The surfacer or topcoating of the present invention contains a polyisocyanate compound in combination with the aforesaid hydroxyl group-containing resin as vehicle components.

The polyisocyanate compounds which can be used in the present invention are those having at least two free isocyanate groups in the molecule. Representative examples of such compounds are tolylene diisocyanate, 4,4'-diphenylmethane diisocyanate, xylylene diisocyanate, hexamethylene diisocyanate, 2,6-diisocyanate methylene caproate, trimethyl hexamethylene diisocyanate, dimer acid dissocyanate, hydrogenated 4,4'-diphenylmethane diisocyanate, hydrogenated tolylene diisocyanate, isophorone diisocyanate, adduct of tolylene diisocyanate (3 moles) with trimethylolpropane (1 mole), tolylene diisocyanate polymer, adduct of hexamethylene diisocyanate (3 moles) with trimethylolpropane (1 mole), reaction product (biuret) of hexamethylene diisocyanate (3 moles) and water (1 mole), adduct of xylylene diisocyanate (3 moles) with trimethylolpropane (1 mole), polymer of tolylene diisocyanate (3 moles) with hexamethylene diisocyanate (2 moles), etc. The polyisocyanate compounds can be used in the form of blocked compounds having the isocyanate group protected with blocking agents. Preferable blocked isocyanate compounds are those capable of producing a free isocyanate group when heated at a temperature of about 80° C. to about 130° C. for curing. The blocking agents to be used are those conventional in the art and include, for example, phenol, cresol, xylenol, isopropyl phenol, ter-butyl phenol, β-naphthol, aldoxyme, ketoxyme, diethyl malonate, ethyl acetoacetate, acetyl acetone, etc. These polyisocyanate compounds can be used singly or at least two of them are usable in admixture. Of the examples enumerated above, those having a high weather resistance and unlikely to become yellow are preferred, such as a reaction product of hexamethylene diisocyanate and water, adduct of xylylene diisocyanate with trimethylolpropane, adduct of tolylene diisocyanate with hexamethylene diisocyanate, isophorone diisocyanate, hexamethylene diisocyanate, 2,6-diisocyanate methylcaproate, etc.

The ratio of the hydroxyl group-containing resin to the polyisocyanate compound in the surfacer or topcoating ranges from about 0.5 to about 2.5:1, preferably about 0.7 to about 2.0:1, calculated as hydroxyl group-/isocyanate group ratio by equivalent. If the two components tend to react at room temperature, they are preferably stored in separate form and mixed together before use.

The surfacer or topcoating to be applied in the invention may be conjointly used, when required, with a catalyst to accelerate the crosslinking reaction between the hydroxyl group and the isocyanate group to form urethane linkage. The catalysts to be used are those conventional in the art for accelerating the reaction. Examples thereof are tertiary amines such as triethylamine, triethylenediamine, hexamethylenetetramine, methylmorpholine, N-ethylmorpholine, N-methylpiperazine, N,N'-dimethylpiperazine, N,N'-dimethylbenzylamine, N,N'-dimethyldodecylamine, N,N,N',N'-tetramethylethylenediamine, N,N,N',N'-tetramethylhexamethylenediamine, N,N,N',N'-tetramethyl-1,3-diaminobutane, etc.; acids such as phosphoric acid, p-toluenesulfonic acid, etc.; metal salts of fatty acids such as lead acetate, potassium oleate, tin octenoate, lead 2-ethylhexoate, iron 2-ethylhexoate, cobalt 2-ethylhexoate, titanium 2-ethylhexoate, etc.; metal salts of alicylic acids such as zinc naphthenate, manganese naphthenate, copper naphthenate, lead naphthenate, nickel naphthenate, cobalt naphthenate, etc.; organic tin compounds such as tri-n-butyl tin chloride, tetra-n-butyl tin, di-n-butyl tin dioctenoate, di-n-butyl tin dilaurate, di-n-butyl tin diacetate, dibutyl tin oxide, dioctyl tin oxide, dibutyl tin di(2-ethylhexoate), etc.; organic phosphates such as dimethyl phosphate, di-n-butyl phosphate, etc.; salts of 1,8-diazabicyclo(5,4,0)-undecane such as phenol, octylic acid or oleic acid salt of 1,8-diazabicyclo(5,4,0)-undecane, etc.; other inorganic or organic catalysts such as antimony trichloride, bismuth nitrate, tin chloride, lead silicate, iron chloride, lead oxide, ferric hydroxide, phenylsodium, tetra(2-ethylhexyl)titanate, etc. These catalysts are usable singly or at least two of them can be used in admixture. Of the examples, preferred catalysts are dibutyl tin di(2-ethylhexoate), tin octenoate, di-n-butyl tin dilaurate, tri-n-butyl tin chloride, tetra-n-butyl tin, di-n-butyl tin diacetate, etc.

The amount of the catalyst to be used for the surfacer or topcoating is about 0.01 to about 1 part by weight, preferably about 0.05 to about 0.5 part by weight, per 100 parts by weight of the resin solids.

The surfacer or topcoating of this invention is an organic coating composition comprising the hydroxyl group-containing resin, an isocyanate compound and when required, a catalyst as disclosed above, dissolved or dispersed in an organic solvent together with a coloring pigment and/or metallic pigment. An extender pigment may be incorporated in the coating when required. Useful organic solvents include those known and capable of dissolving or dispersing the resin. Examples of suitable organic solvents are toluene, xylene, hexane, heptane and like hydrocarbons butanol, hexanol, cyclohexanol, benzyl alcohol and like alcohols; methyl ethyl ketone, methyl isobutyl ketone, cyclohexanone, isophorone and like ketones; dioxane, ethylene glycol monomethyl ether, diethylene glycol monomethyl ether and like ethers; ethyl acetate, ethylene glycol acetate monomethyl ether, diethylene glycol acetate monoethyl ether and like esters; etc.

Useful coloring pigments and metallic pigments are not specifically limited and can be any of those known in the art. The amounts of the coloring pigment and metallic pigment for the coating are not specifically limited and can be determined according to a particular purpose. When required, the surfacer or topcoating can further contain various additives such as a surface-improving agent, cissing inhibitor, ultraviolet absorbing agent, oxidation inhibitor, etc.

According to this invention, it is most suitable to apply the coatings to metallic articles having plastics parts which will deform or change their properties when heated to over 130°, since the primer coat and surfacer coat or topcoat applied can be cured at the same time at a low temperature of between ambient temperature and about 130° C. Such plastics parts include, for example, those of polyethylene, polypropylene and like polyolefins, acrylonitrile-butadiene-styrene copolymer, polycarbonate, polyamide, fiber reinforced plastics (e.g. sheet mold compound), polyurethane resins, etc. Moreover, the primer coat and surfacer coat or topcoat of the invention need not be heated to over 140° C. for curing, contributing to outstanding degree of energy saving. Thus the coating method of this invention can be advantageously used for coating metallic substrates to replace conventional coating method using cationic electrophoretic primers curable at a temperature higher than 140° C.

The primer of the invention can be applied directly to metallic substrates. Nevertheless, it is preferred to apply the primer over a metallic substrate surface-treated with phosphate or the like. The primer of the invention can be applied to the metallic article to be coated by conventional cationic electrophoretic coating methods. For example, it is applied under the following electrophoretic coating conditions:

Solid content of coating: 5 to 35% by weight
Bath temperature 15° to 35° C.
Electric voltage: 100 to 400V
The thickness of the dried primer coat is in the range of about 10 to about 30 $\mu$m, preferably about 15 to about 25 $\mu$m.

It is preferred in the present invention to apply the surfacer or topcoating by wet-on-wet method to the primer coat dried at least to such extent that no undesirable foams are produced due to the reaction of the water remaining in the primer coat and the isocyanate compound which has penetrated from the surfacer coat.

The methods for applying the surfacer or topcoating of the invention are not specifically limited and include various conventional methods. The most preferred method is a spray coating method, in which the surfacer or topcoating to be sprayed is preferably adjusted to a viscosity of about 10 to about 30 seconds (Ford cup No. 4/20° C.). Adequate thickness of the dried surfacer coat or topcoat ranges from about 30 to about 60 $\mu$m, preferably about 40 to about 50 $\mu$m.

The primer and surfacer or topcoating of the invention are applied in this way and cured at a temperature of between room temperature (e.g. usually about 15° C.) and about 130° C. It is preferred to cure the coats at a temperature of about 80° to about 130° C. which is higher than the glass transition temperature of the cationic resin in the primer, whereby the cationic resin is melted to form a smooth coat having excellent corrosion resistance and mechanical strength.

During curing of the coats, there arise cross-linking reactions, within the surfacer coat or topcoat between the hydroxyl group-containing resin and the polyisocyanate compound on one hand and simultaneously at the primer coat-surfacer coat (or -topcoat) interface and within the primer coat between the reactive functional group of the resin in the primer coat and the isocyanate group of the polyisocyanate compound which has penetrated from the surfacer coat (or topcoat) into the primer coat on the other hand. In other words, the coats are formed in this manner by low-temperature curing in two-coatings-one-baking method, resulting in considerable improvements in water resistance, corrosion resistance, weather resistance and like properties.

When required, a conventional topcoating may be applied to the surfacer coat.

This invention will be described below in more detail with reference to the following Examples in which the parts are all by weight.

In the Examples, the procedures proceed according to the following flow chart.

Degreased cold-rolled steel plate→treatment with zinc phosphate→washing with water→drying→electrophoretic coating (primer deposited at the cathode)→washing with water→drying→electrostatic spraying (surfacer or topcoating)→allowing the coats to stand awhile to give a smooth surface→curing.

EXAMPLE 1

(a) Primer

The cationic electrophoretic primer used was an aqueous composition having 20% by weight of the solids and comprising 100 parts (calculated as the solids) of a hydroxyl group-containing cationic resin prepared by reacting 5 moles of bisphenol A diglycidyl ether, 4 moles of bisphenol A and 0.4 mole of dimethyl ethanolamine lactate; 20 parts of titanium white; 0.5 part of carbon black; and 7 parts of clay. A steel plate treated with "Bonderite #3030" (trade name, metallic surface-treating agent of the zinc phosphate type, manufactured by Nihon Parkerizing, Co., Ltd., Japan) used as a cathode was coated with the above primer under the following electrophoretic coating conditions:

Bath temperature: 30° C.
Voltage: 300V
Time for applying current: 3 minutes

The steel plate thus coated was washed with water and dried at 80° C. for 15 minutes. The coat thus obtained had a thickness of about 15 μm.

(b) Topcoating

An acrylic resin (copolymer of butyl acrylate, ethylhexyl acrylate, methyl methacrylate and hydroxyethyl acrylate in a weight ratio of 30:35:25:10, number-average molecular weight of about 10,000 and hydroxyl value of 48) were mixed in OH/NCO equivalent ratio of 1:1 with an addition product of hexamethylene diisocyanate with water. To 100 parts of the mixture was added 100 parts (calculated as solids) of a titanium white paste. The resulting mixture was adjusted to a viscosity of 18 seconds (Ford cup No. 4/20° C.) with a 2:8 (weight ratio) mixture of toluene and xylene and applied to the primer coat to provide a topcoat having a dry thickness of 35 to 40 μm.

(c) Baking

The coats thus formed were set by standing at room temperature for 15 minutes and baked at 120° C. for 30 minutes, giving a coat with a markedly smooth surface.

The coat thus produced was tested for performance with the following results.

Gloss: 95

Weather resistance: 90%
Corrosion resistance: more than 1,000 hours

The gloss is in terms of reflectance determined with incident light falling at an angle of 60° on a coat.

The weather resistance is in terms of gloss-retention ratio determined with a sunshine weatherometer subjected to sunshine for 500 hours.

The corrosion resistance is in terms of time taken until the coat has been separated by a salt spray to a width of 3 mm.

EXAMPLE 2

(a) Primer

Epoxycresol novolak (227 parts, epoxy number of 4.4, softening point of 82° C.) and 132 parts of p-nonylphenol were heated and melted. To the molten mixture was added 0.5 part of 2-phenylimidazole (catalyst) and the mixture was heated to a temperature of 160° C. to undergo reaction until the epoxy number reached 1.5. To the reaction product was added 205 parts of bisphenol A and the mixture was reacted at 140° C. until the epoxy number became substantially 0. To the reaction product were further added 380 parts of bisphenol A diglycidyl ether and 71.5 parts of monoethanolamine methylisobutyl ketone ketimine. The mixture was reacted at the same temperature until the decrease of epoxy group content was terminated. The reaction product was diluted with 203 parts of ethylene glycol monobutyl ether and 20 parts of 2-ethylhexanol and cooled.

Acetic acid (1.5 parts) was added to 122 parts of the reaction product thus obtained to become protonic. The mixture was diluted with water to give a cationic electrophoretic bath having a 20% by weight of solids content. Then electrophoresis was conducted at a bath temperature of 30° C. and electric voltage of 250V to form a primer coat having a dry thickness of 30 μm over a steel plate (cathode) treated with zinc phosphate (trade name "Bonderite #3080," product of Nihon Parkerizing Co., Ltd.). The coated plate was washed with water and dried at 50° C. for 15 minutes.

(b) Topcoating

An acrylic resin (copolymer of methacrylate, styrene, butyl acrylate, propylene glycol monoacrylate and acrylic acid in a weight ratio of 24:20:35:20:1, number-average molecular weight of about 20,000 and hydroxyl value of 86) was mixed in OH/NCO equivalent ratio of 1:1 with an addition product of xylylene diisocyanate with trimethylol propane. To 100 parts (calculated as the solids) of the mixture were added 0.5 part of tetra-n-butyl tin and 100 parts (calculated as the solids) of a titanium white paste. The mixture was adjusted to a viscosity of 18 seconds (Ford cup No. 4/20° C.) with a 2:8 (weight ratio) mixture of toluene and xylene. The resulting mixture was applied to the primer coat with a spray to provide a topcoat having a dry thickness of 35 to 40 μm.

(c) Baking

The coats thus formed were set by standing at room temperature for 15 minutes and baked at 100° C. for 30 minutes, giving a coat with a markedly smooth surface.

The coat thus produced was tested for performance in the same manner as in Example 1 with the following results.

Gloss: 95

Weather resistance: 90%
Corrosion resistance: more than 1,000 hours

EXAMPLE 3

(a) Primer

Bisphenol A diglycidyl ether (228 parts) and 55 parts of polycaprolactone diol (molecular weight of 550) were heated and 0.7 part of dimethylbenzylamine (catalyst) was added to the mixture. The resulting mixture was reacted at 160° C. until the epoxy number reached 3.5. To the reaction product was added 91.2 parts of bisphenol A and the mixture was reacted at 130° C. until the epoxy number of 0.53 was obtained. To the reaction product were added 74.8 parts of ethylene glycol monobutyl ether, 11.2 parts of benzyl alcohol and 15 parts of methylethanolamine. The mixture was reacted at 90° C. until the tertiary amine value reached 28.8.

The reaction product (123 parts) was protonized with 1.1 parts of acetic acid and diluted with water to give an aqueous dispersion having 30% by weight of solids content. To the dispersion was added the pigment paste (having a pigment particle size of about 10 μm) obtained by dispersing 20 parts of titanium white, 0.3 part of carbon black, 0.5 part of a nonionic surface active agent of the polyoxyethylene nonylphenyl ether type (HLB 14), 6.2 parts of the above reaction product, 0.11 part of acetic acid and water to give an electrophoretic bath having 22% by weight of solids content.

Electrophoresis was conducted by passing a current through the bath at 28° C. and 300V to form a primer coat having a dry thickness of 26 μm over a steel plate treated with zinc phosphate (trade name "Bonderite #3080," product of Nihon Parkerizing Co., Ltd.). The coated plate was washed with water and dried at room temperature for 30 minutes.

(b) Topcoating

An acrylic resin (copolymer of styrene, isobutyl acrylate, ethyl methacrylate, hydroxyethyl methacrylate and acrylic acid in a weight ratio of 30:20:27:20:3, number-average molecular weight of 30 000 and hydroxyl value of 86) was mixed in OH/NCO equivalent ratio of 1:1 with an addition product of hexamethylene diisocyanate with water. To 100 parts (calculated as the solids) of the mixture were added 0.5 part of di-n-butyl tin dilaurate and 100 parts (calculated as the solids) of titanium white, and the mixture was adjusted to a viscosity of 18 seconds (Ford cup No. 4/20° C.) with a 2:8 (weight ratio) mixture of toluene and xylene. The topcoating thus obtained was applied to the primer coat with a spray to form a topcoat having a dry thickness of 35 to 40 μm.

(c) Baking

The coat thus produced was set by standing at room temperature for 15 minutes and baked at 90° C. for 30 minutes, giving a coat with a markedly smooth surface.

The coat thus produced was tested for performance in the same manner as in Example 1 with the following results.
Gloss: 95
Weather resistance: 90%
Corrosion resistance: more than 1,000 hours

We claim:

1. A coating method comprising the steps of: applying electrophoretically to an electroconductive substrate a polyisocyanate-free cationic electrophoretic primer which contains a binder resin having in its molecule at least one functional group capable of reacting with an isocyanate group under curing conditions to form a primer coat, applying by a non-electrophoretic method to the primer coat a surfacer or topcoating which consists essentially of an organic solvent having dispersed or dissolved therein a hydroxyl group-containing resin and a polyisocyanate compound to form a surfacer coat or topcoat, and curing the two coats at the same time at a temperature between room temperature and about 130° C.

2. A method according to claim 1 wherein the resin containing the functional group in its molecule has a glass transition temperature of about 50° to about 120° C.

3. A method according to claim 2 wherein the glass transition temperature is in the range of about 70° to about 100° C.

4. A method according to claim 1 wherein the hydroxyl group-containing resin has a hydroxyl value of about 20 to about 200.

5. A method according to claim 4 wherein the hydroxyl value ranges from about 30 to about 80.

6. A method according to claim 1 wherein the surfacer or topcoating contains the polyisocyanate compound relative to the hydroxyl group-containing resin in a hydroxyl group/isocyanate group equivalent ratio of about 0.5 to about 2.5:1.

7. A method according to claim 1 wherein the surfacer or topcoating contains a catalyst for promoting the reaction between the hydroxyl group of the resin and the isocyanate compound.

8. A method according to claim 1 wherein the two coats are cured at a temperature of about 80° to about 130° C.

9. A method according to claim 1 wherein the polyisocyanate compound is a free polyisocyante compound.

10. A method according to claim 1 wherein the polyisocyanate compound is a blocked polyisocyanate compound capable of producing a free isocyanate group when heated at a temperature of about 80° C. to about 130° C.

* * * * *